United States Patent [19]

Starck

[11] Patent Number: 4,636,856
[45] Date of Patent: Jan. 13, 1987

[54] ARRANGEMENT FOR TWO-DIMENSIONAL DPCM CODING

[75] Inventor: Alexander Starck, Munich, Fed. Rep. of Germany

[73] Assignee: Siemens Aktiengesellschaft, Berlin and Munich, Fed. Rep. of Germany

[21] Appl. No.: 641,727

[22] Filed: Aug. 17, 1984

[30] Foreign Application Priority Data

Aug. 31, 1983 [DE] Fed. Rep. of Germany ....... 3331426

[51] Int. Cl.⁴ .............................................. H04N 7/13
[52] U.S. Cl. ..................................... 358/135; 375/27
[58] Field of Search ............... 358/135, 136, 133, 141; 375/27

[56] References Cited

U.S. PATENT DOCUMENTS 4,200,886  4/1980  Musmann et al. ................... 358/135
4,255,763  3/1981  Maxemchuk et al. ............... 358/135

Primary Examiner—Howard W. Britton
Assistant Examiner—Victor R. Kostak
Attorney, Agent, or Firm—Hill, Van Santen, Steadman & Simpson

[57] ABSTRACT

An arrangement for differential pulse code modulation coding comprises a controllable quantizer and a quantizer controller and is dependent on picture signal values. The quantizer controller contains a plurality of series-connected registers which store adjacent picture element signal values. A comparison device provides a differential formation between all picture signal values and a control is provided to which all results of the difference formations are supplied and which controls a multiplexer such that only the respectively highest and lowest picture signal values, the extrema, are through-connected for further processing. A subtractor, wherein the difference between the last picture element signal value and the extrema, as well as between the extrema themselves are identified is also provided. A difference selection control through-connects the maximum difference to a threshold logic which controls the quantizer in accordance with the amount of the maximum difference.

9 Claims, 8 Drawing Figures

| $C_{11}$ | $C_{12}$ | $C_{13}$ |             | MW | S1 | S2 |
|----------|----------|----------|-------------|----|----|----|
| 0 | 0 | 0 | $D > B > C$   | B | 1 | 0 |
| 0 | 0 | 0 | $D > C > B$   | C | 1 | 1 |
| 0 | 1 | 0 | $B \geq D > C$ | D | 0 | 1 |
| 1 | 0 | 1 | $C \geq D > B$ | D | 0 | 1 |
| 1 | 1 | 0 | $B > C \geq D$ | C | 1 | 1 |
| 1 | 1 | 1 | $C \geq B \geq D$ | B | 1 | 0 |

| V1 | V2 | V3 |         | MD  | S11 | S12 | IS |
|----|----|----|---------|-----|-----|-----|----|
| 0  | 0  | 0  | A≥F≥E   | A-E | 0   | 0   | 0  |
| 0  | 0  | 1  | A≥E>F   | A-F | 0   | 1   | 0  |
| 0  | 1  | 0  | F>A≥E   | F-E | 1   | 0   | 0  |
| 1  | 0  | 1  | E>A≥F   | E-F | 1   | 0   | 1  |
| 1  | 1  | 0  | F≥E>A   | F-A | 0   | 1   | 1  |
| 1  | 1  | 1  | E>F>A   | E-A | 0   | 0   | 1  |

- - - B C D - - -
- - - A x - - -
- - - - - -

ARRANGEMENT FOR TWO-DIMENSIONAL DPCM CODING

BACKGROUND OF THE INVENTION

1. Field of the Invention

The present invention relates to an arrangement for two-dimensional DPCM coding comprising a controlled quantizer and comprising a quantizer controller to which the most-recently calculated picture element signal value and the adjacent picture element signal values of the preceding television line are respectively supplied.

2. Description of the Prior Art

It is standard in the transmission of color television signals to split the color signal into a luminance signal and two chrominance signals or, respectively, color difference signals. Differential pulse code modulation (DPCM) is frequently employed for data reduction in the transmission of the individual components. After initial experiments with a one-dimensional DPCM coding, the calculation of the assessed value for the determination of the DPCM signals was expanded by a vertical prediction. In comparison to the one-dimensional DPCM process, this two-dimensional DPCM process yielded a noticeable quality enhancement of the transmitted television pictures by way of a corresponding coding of both the luminance and the chrominance.

A control of the quantization dependent on the activity, i.e. dependent on the contrast between corresponding picture elements of successive television pictures was investigated in the dissertation "Optimierung von Farbfernseh-DPCM-Systemen unter Berücksichtigung der Wahrnehmbarkeit von Quantisierungsfehlern", by Peter Pirsch at the Technische Universität, Hannover, 1979. The introduction of this controlled quantization in two-dimensional DPCM usually produced an additional improvement in the pictures in the luminance path. Insofar as reasons of expense are not in opposition, controlled quantization can, of course, also be employed in the case of chrominance signals. The effects of controlled DPCM were simulated in a data processing system. Teachings to a technically-feasible realization are, however, lacking.

SUMMARY OF THE INVENTION

It is therefore an object of the present invention to provide an arrangement for DPCM coding/decoding which can be realized in a simple manner.

The above object is achieved in that a plurality of registers connected in series are provided, the picture element values of the television line which are adjacent to the processing picture element signal being stored in these registers. The quantizer controller contains a comparison device which executes an amplitude comparison between the picture element signal values of the preceding television line. A selection control is connected to the outputs of the comparison device. A peak value control is provided which through-connects two peak values of the picture element signal values to a subtraction device via a multiplex device, the most recently-calculated picture element signal value also being supplied to the subtraction device and the difference between the most recently-calculated picture element signal value and the peak values, as well as between the peak values being formed therein. A difference selection control to which the operational sign bit of the differences are supplied is provided. A multiplexer is connected to the outputs of the subtraction device, the difference selection control through-connecting the highest, amount-wise, difference via the multiplexer to a threshold logic which controls the quantizer.

The assessed value x must be determined in the coder. In order for the decoder to be able to execute the same calculation as the coder, the assessed value may not be determined from the original picture element signal values, but only from the picture element signal values from the so-called local output which have already been calculated in the coder. The highest and the lowest picture element values, the extrema, are first identified in the coder from the picture element signal values of the preceding line. Only simple comparators and the multiplexer are required for this purpose. The computational operation with the last picture element signal value A is always time-critical. It is seen to by way of registers (digital memory) that the extrema are extant for further processing at the same time as the picture element signal value last-calculated. After a subtraction which, for example, is executed by way of addition of the two's complements, the greatest difference of the picture element signal values must be connected through to a threshold logic via which the quantizer is controlled. This is achieved by way of a difference selection control to which only the operational sign bits of the formed differences are respectively supplied. The difference selection control, as well as the extremum control are constructed in an extremely simple manner and only comprise two simple gate circuits.

It is advantageous that an inverter circuit be inserted between the output of the multiplexer and the threshold logic, the inverter circuit, given a negative operational sign of the greatest difference, emitting the amount of the maximum difference to the threshold logic by way of formation of the two's component.

The threshold logic becomes more simple due to the formation of the amount of the greatest difference, since the operational sign need not be taken into consideration.

It is expedient that three picture element signal values of the preceding television line are provided for the calculation of a vertical prediction value; that three comparators having two inputs each are provided; and that two electronic transfer switches are provided as the multiplexer.

A considerable improvement of the picture quality already occurs with the utilization of three picture element signal values of the preceding television line for the calculation of the vertical prediction value. The use of more than three preceding picture element signal values effects only an insignificant improvement; even a slight deterioration of the prediction value in special instances.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
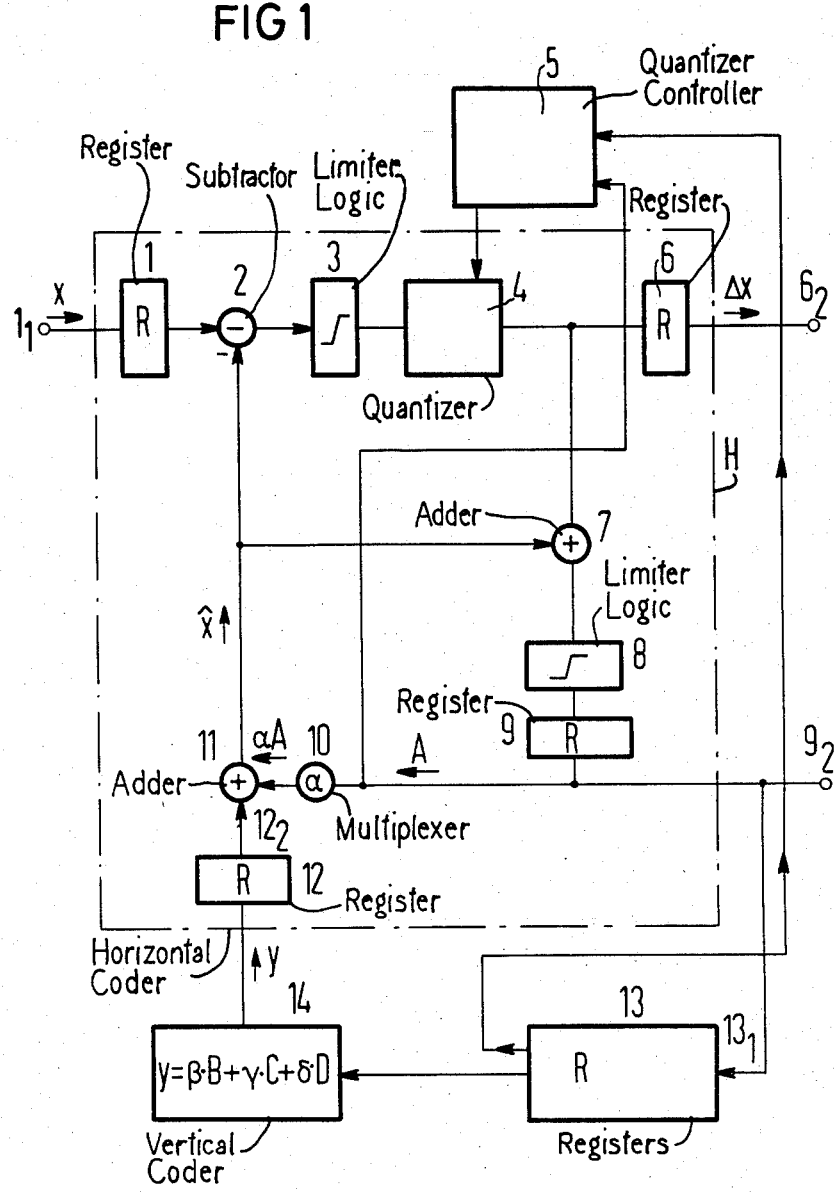
FIG. 1 is a basic circuit diagram of a two-dimensional DPCM coder.

Referring to FIG. 1, a DPCM coder is illustrated as comprising a horizontal coder H and a vertical coder 14. A first register 1, whose output is connected to a subtractor 2, is connected to the input $1_1$ of the DPCM coder. The output of the subtractor is connected to the input of a limiter logic 3, whose output is connected to the input of a controllable quantizer 4. A second register 6 is connected to the output of the quantizer 4 and re-emits the quantized DPCM values $\Delta x$ at its output $6_2$. An adder 7 is also connected to the output of the quantizer 4. The coder loop is closed via the subtractor 2 by the series connection of an adder 7, a second limiter logic 8, a register 9, a multiplexer 10 and an adder 11. The output $9_2$ of the register 9, which is also referred to as a local output, is connected to the input of the vertical coder 14 via further registers 13 by way of which the picture signal values are delayed by approximately one television line. The output of the vertical coder 14 is connected via a register 12 to the second input of the adder 11. The first output of the adder 11 is again connected to the second input of the first adder 7. The control inputs of the quantizer 4 are connected to the output of the quantizer controller 5, whose inputs are connected to the output of the register 9 and to the outputs of the further registers 13.

Figure 2:
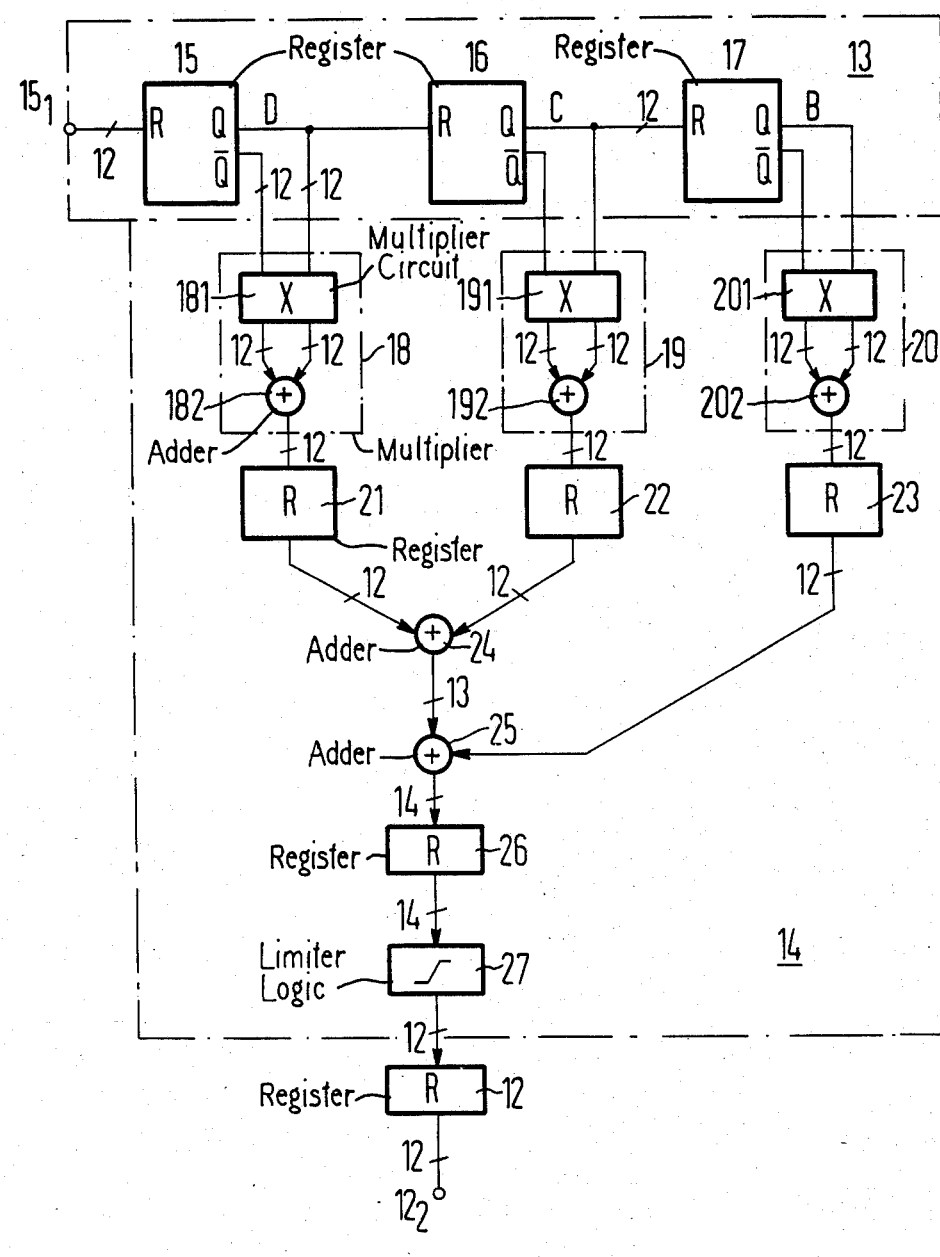
FIG. 2 is a schematic representation of a vertical coder.

Three of the further registers 13 and the vertical coder 14 are illustrated in detail in FIG. 2. The further registers 13 consist of a shift register including three series-connected single registers 15, 16 and 17. The outputs Q and the inverted outputs $\overline{Q}$ of the register 15 are connected to the first input of an adder 24 via a multiplier 18 and a register 21. The output Q, $\overline{Q}$ of the register 16 are connected to the second input of the adder 24 via a multiplier 19 and a register 22. The output Q, $\overline{Q}$ of the register 14 are connected via a multiplier 20 and a register 23 to the second input of an adder 25 whose first input is connected to the output of the adder 24. The multipliers 18, 19 and 20 respectively contain a multiplier circuit 181, 191, 201 and an adder 182, 192 and 202.

The output of the adder 25 is connected to the input of the second adder 11 via a register 26 and a limiter logic 27, and further via the register 12 comprising the output $12_2$. All registers serve as digital memories or transport delay units.

Figure 3:
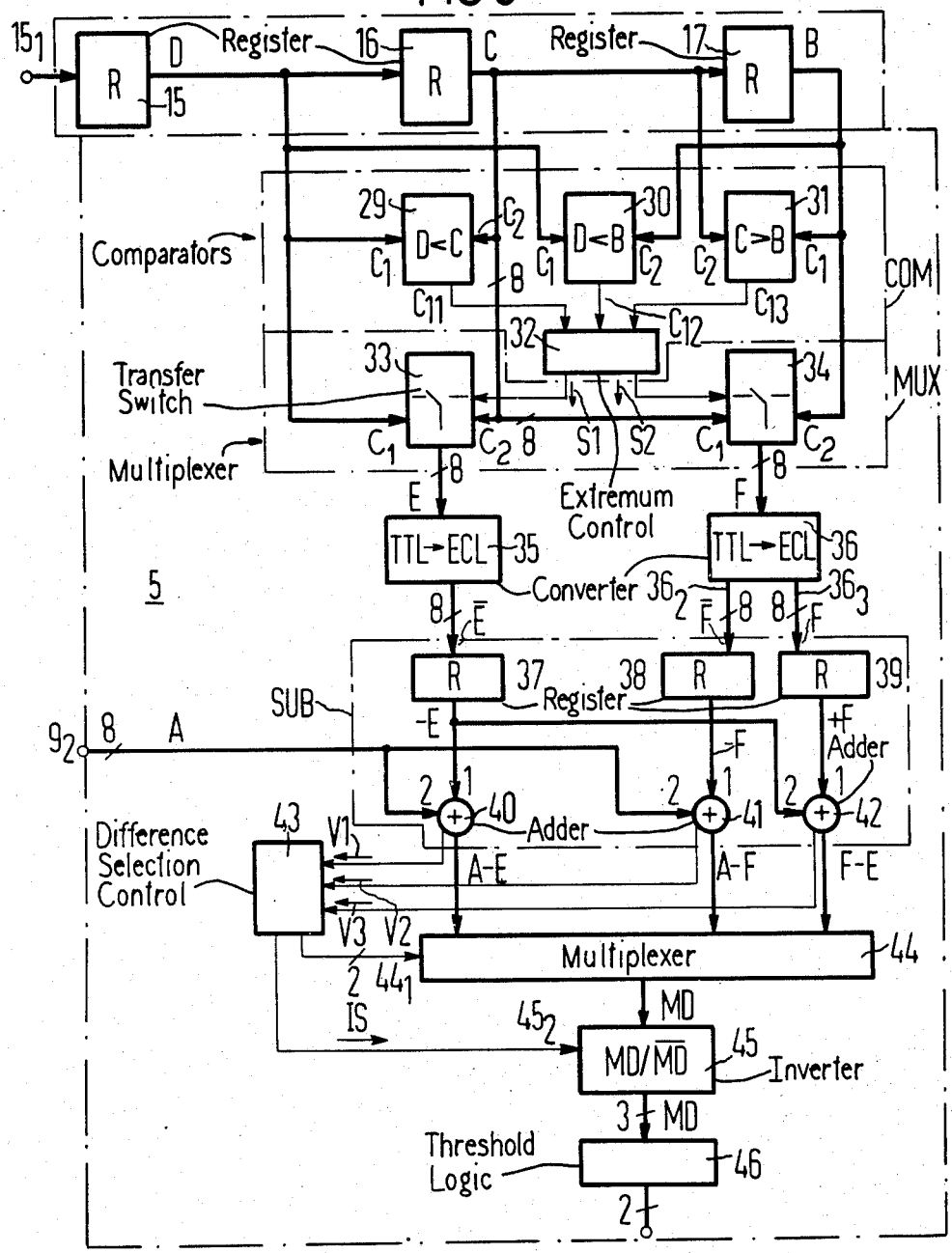
FIG. 3 is a schematic representation of a quantizer controller.

The essence of the invention, the quantizer controller 5, is illustrated in FIG. 3. For the purpose of a better understanding of the invention, the series-connected series-registers 15, 16 and 17 have likewise been illustrated again in FIG. 3. The outputs of the registers 15-17 are connected to the inputs of three comparators 29, 30 and 31. Therefore, the output of the register 15 is connected to the first input $C_1$ of the first comparator 29 and to the first input $C_1$ of the second comparator 30. The output of the register 16 is respectively connected to the second input $C_2$ of the first comparator 29 and of the third comparator 31, whereas the output of the register 17 is connected to the first input $C_1$ of the third comparator 31 and to the second input $C_2$ of the second comparator 30. The outputs $C_{11}$, $C_{12}$ and $C_{13}$ of the three comparators 29-31 are connected to the inputs of an extremum control 32, whose outputs are connected to the control inputs of a first multiplexer MUX comprising two transfer switches 33 and 34.

The inputs $C_1$, $C_2$ of the first transfer switch 33 are respectively connected to the output of the register 15 and to the output of the register 16. The inputs $C_1$, $C_2$ of the second transfer switch 34 are respectively connected to the output of the register 16 and to the output of the register 17. The output of the first transfer switch 33 is connected to a register 37 via a converter 35 and the output of the second transfer switch 34 is connected to a converter 36 at whose output $36_2$ the input signal is emitted inverted and at whose output $36_3$ the input signal is emitted noninverted. The outputs of the second converter 36 are connected to registers 38 and 39, respectively.

The outputs of the registers 37, 38 and 39 are respectively connected to the first input of an adder 40, 41 and 42. The second inputs of the adders 40 and 41 are connected to the output $9_2$ of the register 9 (FIG. 1). The second input of the adder 42 is connected to the output of the register 37. The data outputs of the adder 40-42 are connected to a multiplexer 44 whose control input $44_1$ is connected to a difference selection control 43. The operational sign bits of the adders 40-42 are also supplied to the latter. The output of the multiplexer 44 is connected to the input of an inverter 45, which is likewise controlled by the difference selection control 43, and whose output is connected to the input of a threshold logic 46. The numerals at the data lines indicate the width of the data bus in bits.

The extremum control 32 and the difference selection control 43 are simple gate circuits whose structure depends on the type of comparator employed. One respective illustrated embodiment of the controls is set forth hereinbelow. The function of the two-dimensional DPCM coder with quantization control shall be explained first.

Figures 6, 7, 8:
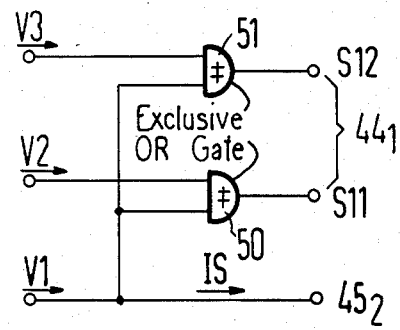
FIG. 6 is a table for the identification of the greatest difference between the three picture element signal values.
FIG. 7 is a schematic circuit diagram of a difference selection control.
FIG. 8 is a schematic representation of an excerpt from a television picture.

In this exemplary embodiment, a two-dimensional DPCM coding is to occur, for example, only for the luminance signal. The digitized picture element signals x (for example luminance signals) are supplied to the first register 1. The assessed value $$x = \alpha A + \beta B + \gamma C + \delta D$$

is calculated in the DPCM coder, whereby A is the calculated picture element signal value of the picture element horizontally adjacent at the left to the picture element signal x, B is that line thereabove, C is the picture element signal of that above the picture element signal x to be coded, and B is the picture element signal value to the right of the value indicated by C (FIG. 8).

In order, for example, for the receiver to be able to make the same prediction as the transmitter, i.e. in order for the original picture element signal x to be calculated, the coder must not calculate with the original picture element signals. The picture element signal values appearing at the local output (corresponding to the output of the register 9) are therefore employed for the calculation of the assessed value x. What is thereby always meant by picture element signal values A, B, C and D are the signal values identified by the DPCM coder, and emitted at the local output. The prediction value $\alpha A$ is calculated by the horizontal coder; for the vertical component of the prediction, the picture signal values of the local picture traverse the further registers 13, in which they are delayed, and the vertical coder, in which the vertical component y of the prediction is determined by multiplying the picture signal values by constant factors. The horizontal prediction value $\alpha \cdot A$ and the vertical prediction value $$Y = \beta B + \gamma C + \delta D$$

are added to one another in the second adder 11 and the result of this addition, the assessed value x, is supplied to the subtractor 2 for the calculation of the DPCM value $\Delta x$. Achieved by way of the registers in the DPCM coder is that the values to be processed are available in the time-suitable manner at the adders, subtractors and multipliers. These registers correspond to clocked memories. The bit width of the data to be processed in defined by the limiter logics. The calculated DPCM value $\Delta x$ is emitted at the output $6_2$ of the register 6 and is generally transmitted via a coder (not shown).

All picture element signal values A,B,C and D employed for the calculation of the prediction value x are supplied to the quantizer controller 5.

The picture element signal values A,B,C,D are stepped into the registers 17, 16 and 15 (FIG. 2) via the input $15_1$ of of the register 15. The picture element signal values are respectively multiplied, generally with different factors in the multipliers 18–20, and are combined via the adders 24 and 25. The limiter logic reduces the data word width.

The quantizer controller illustrated in FIG. 3 compares all picture element signal values to one another, identifies the amount of the greatest difference and controls the quantizer 4 as a function of this difference. The identification of the maximum difference occurs in two steps. First, the two extrema E, F, for example B and D are identified from the picture element signal values BCD of the most recent television line. The comparators 29–31, the extremum control 32 and the transfer switches 33 and 34 are required for this purpose. The extrema E, F are then subtracted from the last picture element signal value A and the difference between the two extrema E and F is also formed. The maximum difference MD is determined from the operational sign of these differences. The maximum difference is interpreted via the simple threshold logic 46 and the quantizer 4 is correspondingly controlled.

The manner of operation of the quantizer controller shall now be described in detail.

The picture element signal values B,C and D are at the outputs of the registers 15,16 and 17. The first comparator 29 compares the picture element signal values D and C to one another; the second comparator 30 compares the picture element signal values B and D to one another; and the third comparator 31 compares the picture element signal values B and C to one another.

When the value at the input $C_1$ is greater than or the same size as the value at the input $C_2$ of the comparator, then the comparator emits a logical "0" at its output. A logical "1" is at the output only when the value at the input $C_1$ is smaller than the value at the input $C_2$.

Figures 4, 5:
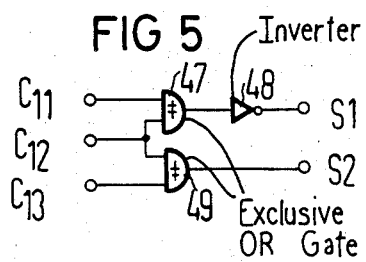
FIG. 4 is a table for the identification of the highest picture element signal value and the lowest picture element signal value.
FIG. 5 is a schematic representation of an extremum control.

All possible cases are illustrated in the table of FIG. 4, whereby the first column represents the output signals of the comparators 29–31 at the outputs $C_{11}$, $C_{12}$ and $C_{13}$.

As a consequence of the extremum control 32, only the respectively identified extrema B, C or D need be through-connected, these being referred to as E and F at the output of the transfer switches 33 and 34. The mean value, referenced MW in the table of FIG. 4, is no longer required. A "0" as the output signal S1 or S2 of the extremum control 32 effects that the input of a transfer switch 33, 34, which is applied to the side of the control input, is through-connected.

The extremum control for three picture element signal values is illustrated in FIG. 5. It comprises two EXCLUSIVE-OR gates 47 and 49 having two of their inputs interconnected and connected to the output $C_{12}$ of the comparator 30. The second input of the EXCLUSIVE OR gate 47 is connected to the output $C_{11}$ and the second input of the EXCLUSIVE OR gate 49 is connected to the output $C_{13}$ of the comparator 31. The output of the EXCLUSIVE OR gate 47 is also followed by an inverter 48 at whose output the control signal S1 is available. The control signal S2 is correspondingly supplied by the EXCLUSIVE OR gate 49.

The control logic will end up different depending on the type of comparator employed; however, its realization with reference to a table corresponding to FIG. 4 presents no difficulties.

In accordance with FIG. 3, the extrema E and F in the exemplary embodiment are conducted via converters 35 and 36 for processing with a faster circuit technology, for example emitter-coupled logic (ECL) technology. The extrema E is thereby inverted, whereas the other extremum F exists in both inverted and non-inverted form after the conversion.

The differences $A-E$, $A-F$ and $F-E$ are formed with the assistance of the adders, 40, 41 and 42. Numerous variations are thereby possible. Instead of an inversion of the extrema before the addition, of course, the two's complements can be mathematically correctly formed. When this is omitted, then the error can be corrected by way of adding the value 1 with the assistance of the carry input of the adder. This error can also be ignored since all differences have the same error. It has been assumed in this example that the formation of the differences occurs correctly. Whereas the differences are supplied to the multiplexer 44, the operational sign are interpreted by the difference selection control 43.

FIG. 6 illustrates a table corresponding thereto. The maximum difference MD is connected through to the inverter 45 in accordance with the table of FIG. 6. When the difference is negative, then a complement formation by the inverter is effected via the difference selection control. As a result thereof, the amount of the maximum difference MD is always supplied to the threshold logic 46. When the amount formation is foregone, then the threshold logic must be correspondingly adapted. It is sufficient that the threshold logic evaluator, for example, the three most significant bits. A control signal S11, S12 which is two bits wide is output by the threshold logic; and four different quantization characteristics can be set by way of the control signal S11, S12.

The difference selection control 43 is illustrated in FIG. 7 and is constructed as a simple gate circuit which contains two EXCLUSIVE OR gates 50 and 51 whose first inputs are interconnected and connected to the operational sign output of the adder 40. The second input of the EXCLUSIVE OR gate 50 is connected to the operational sign output of the adder 41 and the second input of the EXCLUSIVE OR gate 51 is connected to the operational sign output of the adder 42. The operational sign output of the adder 40 is directly supplied to the inverter 45 and the two control bits S11, S12 at the outputs of the EXCLUSIVE OR gates 50 and 51 control the multiplexer 44.

Details which are insignificant to the invention, for example a control that sees to it that no vertical prediction is undertaken at the first line of each field, have been omitted for the sake of simplicity.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In an arrangement for two-dimensional differential pulse code modulation of digital picture element signal values, and of the type in which a controlled quantizer receives and quantizes differential pulse code modulation values, which are the difference between the digital picture signal values and assessed values (x), and in which the most recently calculated digital picture signal value (A) prior to the signal value (x) being processed and adjoining calculated picture element signal values (B,C,D) above and on each side of the recently calculated picture element signal value (x) being processed are delayed in delay means and used for calculating the assessed values (x), the improvement therein comprising:

a quantizer controller connected to the delay means to receive the calculated picture signal values (A,B,C,D) and connected to and operable to control the quantizer, said quantizer controller comprising a plurality of serially-connected registers for receiving and storing the adjoining calculated signal values (B,C,D);

comparison means connected to said plurality of registers and operable to compare the amplitudes represented by the adjoining calculated picture element signal values (B,C,D) with one another and to produce respective first control signals (C11, C12, C13), representing the differences between the amplitudes;

extrema selection control means connected to said comparison means and operable in response to said first control signals to select and produce second control signals (S1,S2) selecting the extrema values (E), (F) of the amplitudes of the calculated picture element signal values (B, C, D);

first multiplex means connected to said plurality of registers and to said extrema selection control means and operable in response to said second control signals to through-connect the extrema values (E), (F);

substraction means connected to said first multiplex means for receiving the extrema values (E), (F) and connected to the delay means for receiving the most recently calculated picture element signal value (A), and operable to produce the difference values (A−F), (A−E) and (F−E) along with operational sign bits;

a difference selection control connected to said subtraction means for receiving said operational sign bits and responsive thereto to produce third control signals for defining the maximum difference value (MD);

second multiplex means connected to said subtraction means and to said difference selection control and responsive to said third control signals to through-connect the maximum difference value (MD) of the difference values (A−F), (A−E) or (F−E); and threshold logic means connected between said multiplex means and the quantizer to control the quantizer.

2. The improved arrangement of claim 1, and further comprising:

an inverter connected between said second multiplex means and said threshold logic means, and connected to said difference selection control and operable to invert the maximum difference value by a two's complement formation when its operational sign is negative.

3. The improved arrangement of claim 2, wherein:

said plurality of registers comprises three registers and only three signals are selected from the preceding line;

said comparison means comprises three comparators each including two inputs connected to two respective registers; and said first multiplex means comprises two transfer switches each connected to two of said registers, respectively.

4. The improved arrangement of claim 3, wherein said extrema selection control comprises:

first and second EXCLUSIVE-OR gates each including an output for the respective second control signals (S1),(S2), connected to a respective transfer switch and first and second inputs, said first inputs connected together and to one of said comparators, said second inputs respectively connected to the other comparators.

5. The improved arrangement of claim 4, and further comprising:

means for providing the two's complements $(\bar{E}),(\bar{F})$ of the extrema values (E), (F) and the extrema value (F); and wherein said comparison means comprises three adders, two of said adders including an input for receiving the value (A) and an input for receiving a respective value $(\bar{E})$, $(\bar{F})$, and the third adder including respective inputs for receiving the values (A) and (F).

6. The improved arrangement of claim 4, and further comprising:

means for providing inversion signals $(\bar{E}),(\bar{F})$ of the extrema values (E), (F) and the extrema value (F); and wherein said comparison means comprises three adders, two of said adders including an input for receiving the value (A) and an input for receiving a respective value $(\bar{E})$, $(\bar{F})$, and the third adder including respective inputs for receiving the values (A) and (F).

7. The improved arrangement of claim 5, wherein:

said difference selection control comprises:

first and second EXCLUSIVE-OR gates each including a first input connected to said output of said first adder, and a second input connected to respective outputs of said second and third adders.

8. The improved arrangement of claim 1, wherein:

said threshold logic means comprises means operable to provide only the three most significant bits of the signal value (MD).

9. The improved arrangement of claim 1, wherein:

said arrangement is constructed as an integrated circuit.

* * * * *